(12) United States Patent
Cahill et al.

(10) Patent No.: US 9,988,013 B2
(45) Date of Patent: Jun. 5, 2018

(54) GRIP TONGUE LATCH PLATE FOR SEATBELT

(71) Applicant: Autoliv ASP, Inc., Ogden, UT (US)

(72) Inventors: Timothy J. Cahill, Dryden, MI (US); Jon E. Burrow, Ortonville, MI (US); Bin Wang, Lake Orion, MI (US); Christopher S. Koprowicz, Macomb, MI (US)

(73) Assignee: AUTOLIV ASP, INC., Ogden, UT (US)

(*) Notice: Subject to any disclaimer, the term of this patent is extended or adjusted under 35 U.S.C. 154(b) by 183 days.

(21) Appl. No.: 14/947,132

(22) Filed: Nov. 20, 2015

(65) Prior Publication Data

US 2017/0144623 A1  May 25, 2017

(51) Int. Cl.
*B60R 22/185* (2006.01)
*B60R 22/28* (2006.01)
*B60R 22/18* (2006.01)

(52) U.S. Cl.
CPC .............. *B60R 22/28* (2013.01); *B60R 22/18* (2013.01); *B60R 2022/1812* (2013.01); *B60R 2022/285* (2013.01)

(58) Field of Classification Search
CPC ............ A44B 11/2553; A44B 11/2561; B60R 2022/1812; B60R 2022/285
USPC ........................................................ 24/181
See application file for complete search history.

(56) References Cited

U.S. PATENT DOCUMENTS

| | | | |
|---|---|---|---|
| 8,636,304 B2 | 1/2014 | Tabata et al. | |
| 8,720,949 B2 | 5/2014 | Tabata et al. | |
| 8,931,806 B2 | 1/2015 | Tabata et al. | |
| 9,204,691 B2 | 12/2015 | Okano et al. | |
| 2004/0227341 A1* | 11/2004 | Hattori | B60R 22/24 280/801.1 |
| 2009/0288275 A1* | 11/2009 | Wendt et al. | B60R 22/28 24/265 BC |
| 2013/0154335 A1 | 6/2013 | Tabata et al. | |
| 2014/0028075 A1 | 1/2014 | Kohlndorfer et al. | |
| 2014/0070596 A1 | 3/2014 | Tabata et al. | |
| 2014/0230195 A1 | 8/2014 | Ruge et al. | |

FOREIGN PATENT DOCUMENTS

| | | |
|---|---|---|
| DE | 10 2012 020 919 A1 | 4/2014 |
| JP | 2009-166586 | 7/2009 |
| WO | WO 2013/125442 A1 | 8/2013 |

* cited by examiner

*Primary Examiner* — Jack W Lavinder
(74) *Attorney, Agent, or Firm* — Brinks Gilson & Lione

(57) ABSTRACT

A tongue for a motor vehicle seat belt restraint system providing high friction restraining belt webbing transfer through the tongue in an impact condition. The tongue incorporates a deformable element which maintains the webbing away from contact with high friction elements in the normal use of the belt system. In a crash condition in which significant tension loads are applied to the belt webbing, the deformable element yields to provide contact between the belt webbing and a high friction surface which restricts the transfer of the webbing from the shoulder belt portion of the webbing to the let belt portion of the webbing which is normally more highly loaded in an impact condition. Several embodiments of deformable elements are described.

15 Claims, 4 Drawing Sheets

GRIP TONGUE LATCH PLATE FOR SEATBELT

FIELD OF THE INVENTION

This invention relates to a seatbelt motor vehicle occupant restraint system and particularly to a tongue component for such systems.

BACKGROUND OF THE INVENTION

Seatbelt assemblies and systems are in widespread use in motor vehicles. Present systems have certain common elements including seatbelt webbing which extends across the upper and lower torso of the occupant, and a retractor for allowing protraction and retraction of the webbing so that the belt may adapt to different sizes of occupants and be conveniently retracted out of the way when not being used. Seatbelt assemblies further typically include a buckle which releasably attaches to a latch plate or tongue.

Seatbelt assemblies must be securely affixed to motor vehicle structural elements in order to provide the necessary restraint effect in vehicle impact conditions and further to meet government regulations. Further, seatbelt assemblies must securely retain an occupant within the seat, while also allowing the occupant easy ingress and egress from the vehicle under a variety of conditions and situations.

Typical seatbelt assemblies include a buckle that is securely mounted to a vehicle structure, such as a seat frame or the floor of the occupant compartment. A tongue (or latch plate) is received by the buckle and is typically attached to the seatbelt webbing. The seatbelt webbing is typically fixed to the vehicle structure at one end, and the opposite end is fixed to a retractor having an internal spool provided to protract and retract the webbing and a lock in impact conditions.

Manufacturers of seatbelt restraint systems and their OEM customers constantly seek to enhance the restraint performance of such systems, both in response to government regulations and consumer demand. With increasing use of seatbelt active type restraint systems, increasing attention is paid to the restraint performance of these systems in impact conditions.

It has been shown in the occupant restraint industry to be beneficial to the occupant in a crash to restrain the occupant's hips as much as possible in order to allow the occupant upper torso to rotate and better utilize the energy management capabilities of the belt system and the frontal impact airbag. One approach to enhance restraint of the hips is to utilize what is known as a crash locking tongue which will lock the belt webbing at the point of transition from the lap to the torso belt sections of the webbing. With a conventional system utilizing a single belt retractor, the tongue (or latch plate) is allowed to slide along the length of the belt webbing enabling it to adapt to different occupant characteristics, seat positions, and other variables. Using a conventional tongue in a frontal impact, the webbing will tend to move from the high load segment (the lap belt portion) to the lower load segment (the torso belt portion). If a crash locking tongue is used in place of a conventional tongue, then the load will not transfer the webbing through the tongue and consequently lower loads are maintained in the torso belt. Although crash locking tongues are used in the industry, but they carry disadvantages in the form of larger size and weight, and higher cost compared to a conventional tongue. This higher weight and cost derive from the fact that there is a specific mechanism inside the tongue that is used to clamp the webbing during a crash.

Some vehicle applications may not need a crash locking tongue to achieve good occupant response. However, these vehicles may still benefit from a tongue which provides higher friction at the lap-torso belt portion transition, and which limits transfer of webbing during a crash without actually locking the webbing.

Also available for motor vehicle applications are tongues which provide increased friction reducing webbing transfer at the lap-torso transition. Such tongues typically utilize specific materials and surface finishes and features for a webbing sliding surface which increases friction, especially when tension is applied to the belt webbing. However, such designs typically have the webbing sliding over the gripping surface during normal use of the belt webbing which may lead to belt abrasion and the degradation of performance of the high friction surface over time.

The present invention is related to a tongue for a belt restraint system that provides higher friction than a standard tongue at the lap-torso transition, but without the locking mechanism of a crash locking tongue and without the above referenced disadvantages. The tongue according to this invention, referred to as a "grip tongue", will be lighter in weight and more cost effective than a crash locking tongue.

SUMMARY

Embodiments of the present invention provide a tongue with a high friction surface that will contact the webbing only in the event of sufficient occupant loading during a crash. In normal operation of the seatbelt system, the high friction surface will not contact the webbing thus avoiding a webbing abrasion concern mentioned previously during normal belt use. Contact of the webbing to the frictional surface of the tongue is brought about via a variety of described deformable members designed to deflect during high belt load conditions of an accident, permitting engagement between the webbing and the high friction surface, while maintaining the webbing away from engagement during normal use of the belt system.

DETAILED DESCRIPTION OF THE INVENTION

Figure 1:
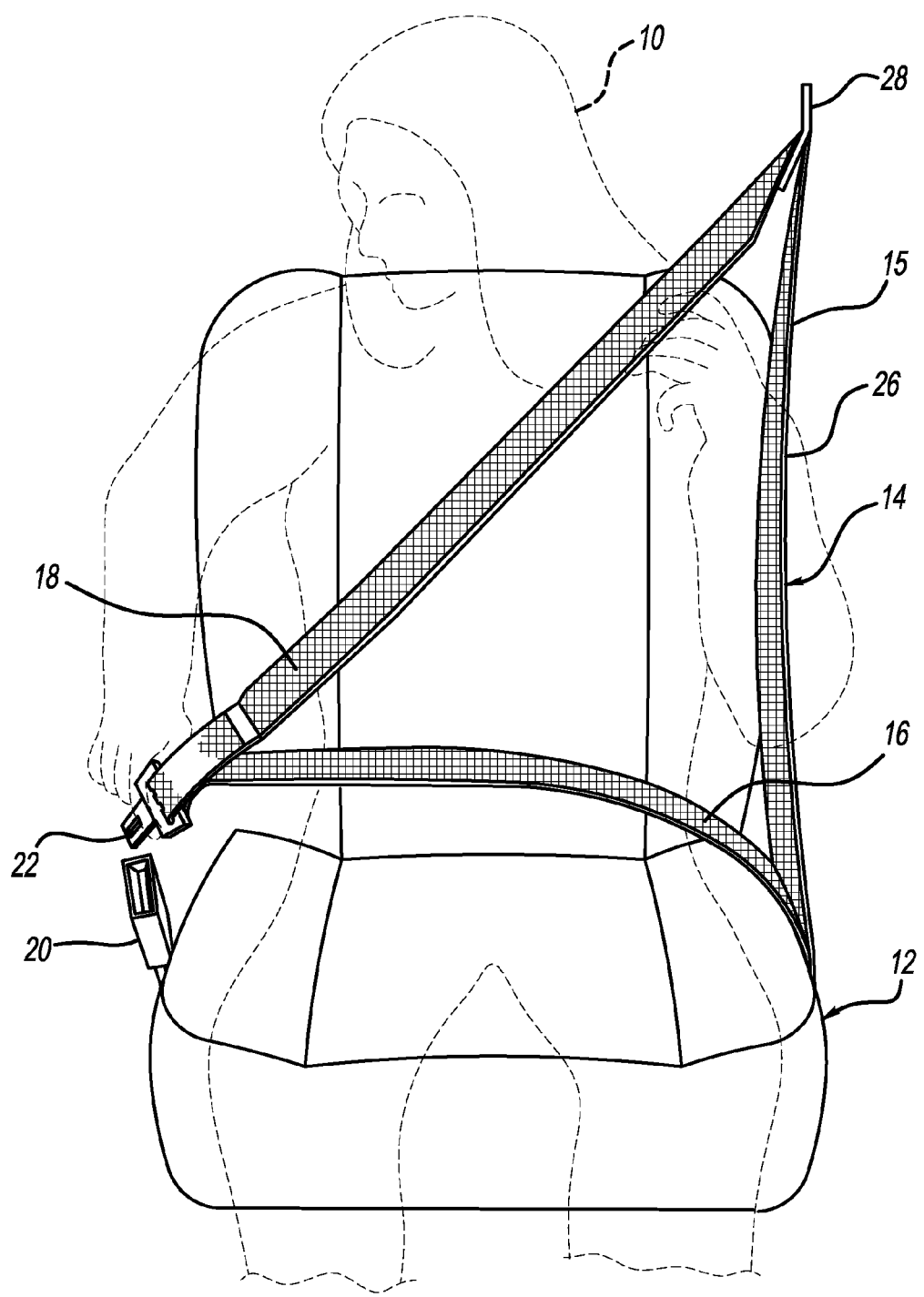
FIG. 1 is a front diagrammatic view illustrating an occupant utilizing a conventional three-point type single retractor seatbelt system which may incorporate a grip tongue in accordance with the present invention.

With reference to FIG. 1, there is illustrated in phantom lines an occupant 10 seated in a motor vehicle occupant seat 12. Occupant 10 is shown fastening a three-point belt restraint system 14. Restraint system 14 typically includes webbing 15 forming lap belt portion 16, shoulder belt portion 18, and further including buckle 20, and tongue (or latch plate) 22. A seat belt retractor 24 (not shown), is used for engaging an end of the downward extending section 26 of shoulder belt section 18, and is used for allowing extraction and retraction of the seat belt webbing. Retractor 24 can be mounted in various locations such as on seat 12, on the floor pan of the vehicle adjacent the side of the seat, or behind a trim panel on a vertical door pillar at the position of guide loop 28, as shown in FIG. 1. Tongue 22 is permitted to slide along the webbing 15, dividing the webbing between lap belt portion 16 and shoulder belt portion 18.

Figure 2:
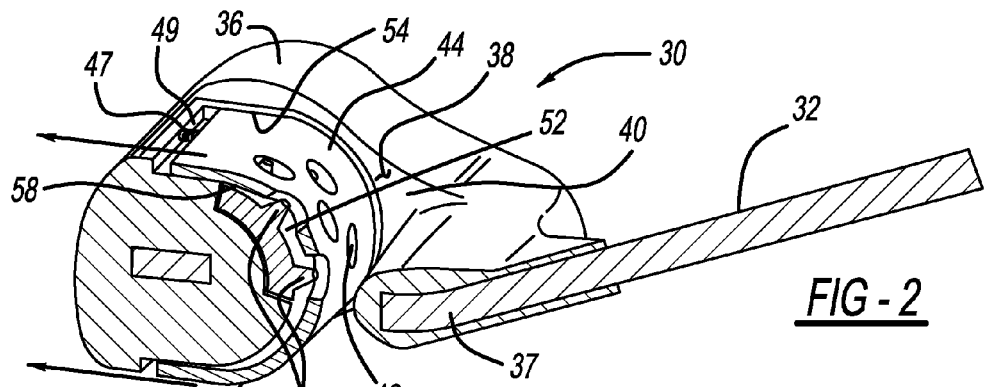
FIGS. 2, 3, and 4 are isometric views of a first embodiment of a grip tongue in accordance with the present invention.
Figure 3:
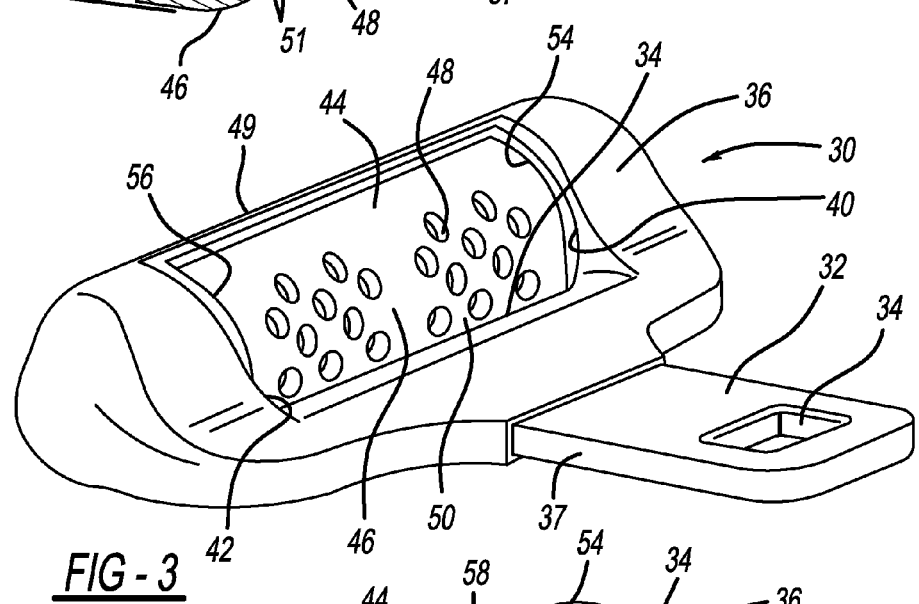
Figure 4:
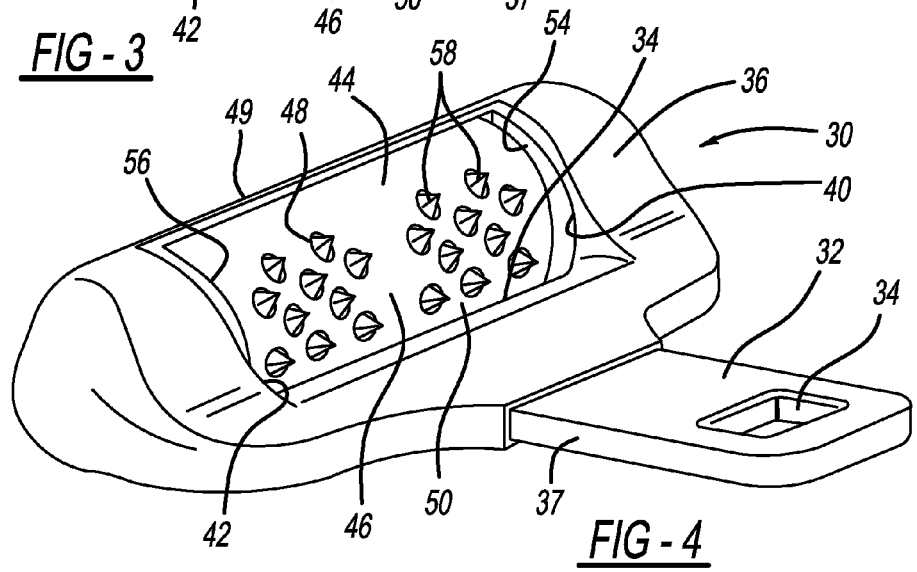

This invention is related to designs of a grip tongue which can be used in the seatbelt restraint system 14 illustrated in FIG. 1 (or for modified designs of the restraint system), a first embodiment of which is shown in FIGS. 2-4 and designated by reference number 30. Grip tongue 30 may be formed of a yoke shaped metal plate structure having extending engagement tab 32 with engagement slot 34 which are adapted to be received by buckle 20 for latching engagement. Body 36 of grip tongue 30 may be formed by over-molding a resin material onto and underlying metal plate substrate 37. Body 36 forms webbing receiving slot 38 which is bounded at its lateral edges by sides 40 and 42. Slot 38 receives seatbelt webbing 15 and guides it to slide along and over webbing contact surface 44. Depending on the use condition of restraint system 14, webbing 15 may contact surface 44 at a tangent line, away from contact, or may be wrapped around the surface along a webbing wrapped angle, typically up to around 120° when you achieve restraint system 14 is fastened. Webbing contact surface 44 is arcuate in shape and may be a semi cylinder or some other convex shape.

Tongue webbing contact surface 44 is formed in part by a deformable or movable plate 46 featuring a plurality of apertures 48. Plate 46 is biased to be maintained in the position illustrated by FIGS. 2 and 3 during normal use of the restraint system. As illustrated plate 46 exhibits a generally smooth external surface 50 which provides minimal restriction and friction to the relative sliding contact with webbing 15. Cavity 49 permits movement of plate 46 from the normal position shown in FIGS. 2 and 3, to a deflected condition illustrated in FIG. 4. Plate 46 may be biased by various means including discrete spring elements such as spring element 47, such that the plate moves between the positions without changing its shape. Alternatively plate 46 may be formed of a thin preferably metal material which is readily deformed for purposes which will be described. For such a configuration, plate 46 would change its shape by deflecting without the requirement of a discrete spring element. Four either configuration, once deflected plate 46 may rest against bearing surface 52 formed by body 36. This configuration would bias the element as shown but permit a deflected condition to occur. The side edges of plate 46 are captured by side pockets 54 and 56. A metal spring element 47 such as formed from flat sheet metal may be positioned in a cavity 49 to bias plate 46.

A number of protrusions 58 are formed by tongue body 36 (or by an insert element 51) at positions directly underlying apertures 48. Protrusions 58 are configured such that in a deflected compressed condition of plate 46, the protrusions extend beyond the outer surface of the plate and will engage with the webbing. This condition is illustrated by FIG. 4. The material forming protrusions 58 may be formed of a resin material, for example as an overmold of the tongue body or a metal or another hard surface designed to present high frictional engagement with webbing 15. During a vehicle frontal impact, tension forces are exerted on lap and shoulder belt portions 16 and 18 which exert force acting on plate 46 in the direction of the arrows shown in FIG. 2. These forces urge plate 46 to retract, allowing protrusions 58 to extend through and beyond apertures 48, in a position to frictionally engage with webbing 15.

When tongue 30 is used in its normal manner, i.e. donning and wearing the belt without crash forces exerted on webbing 15 during normal use of the belt system, the action of spring 47 and plate 46 keep the webbing from contacting the friction surface protrusions 58. The webbing may contact one or both outboard side surfaces 40 and 42, or the opposing inside surface of slot 38. However, during loading of the webbing in a crash event, plate 46 is deflected, providing the high friction engagement caused by exposure of protrusions 58 which reduces the amount of webbing transferred to lap portion 16 as described previously.

The high friction surface of grip tongue 30 provided by protrusions 58 can be produced in a variety of ways. This surface can be formed of a polymer based material with varied patterns to provide a high frictional contact surface for the webbing. The high friction surface can also be metallic, such as aluminum or a zinc based casting. The surface will need to have sufficient edge geometry to provide friction to webbing 15 to perform as intended, but at the same time, not provide excess friction that will result in damage of the webbing to the point where minimum tensile properties are not fulfilled.

Figure 5:
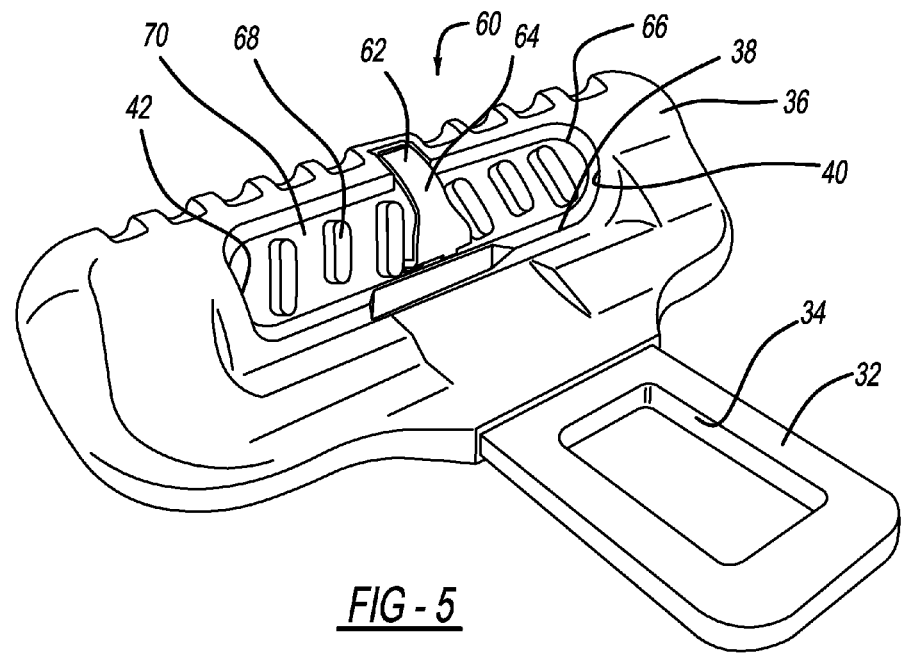
FIG. 5 is an isometric view of a second embodiment of a grip tongue in accordance with the present invention.

Now with reference to FIG. 5, a second embodiment of a tongue in accordance with this invention which is generally designated by reference number 60. Features of tongue 60 which are identical to those previously described are designated with the same reference numbers, and a duplicative description is not provided. Tongue 60 differs from the prior embodiment in that a single spring element 62 is provided at near the center of slot 38 rather than fully extending across the full width of the slot (as does plate 46) will. Spring 62 forms webbing contact surface 64 which cooperates with webbing contact surfaces 66 at the outboard edges of slot 38. For this embodiment a series of protrusions 68 are visually evident but are not operative until a high tensile loading is applied to webbing 15, in a manner which will be described below.

Figure 6:
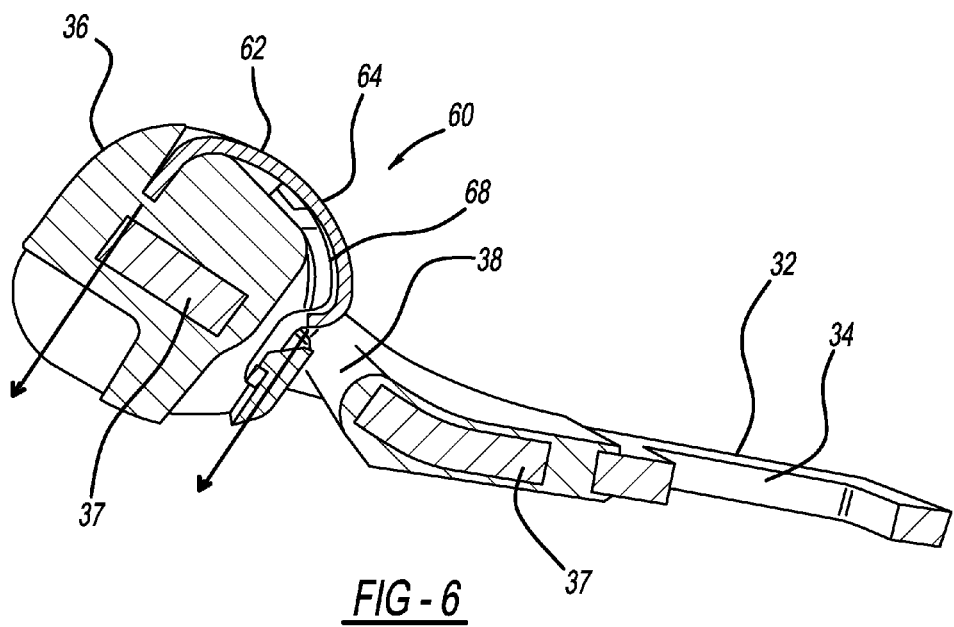
FIG. 6 is a cross-sectional view through the grip tongue shown in FIG. 5.

Spring 62 operates in a manner similar to that of plate 46 and is shown in its normal condition but can be deflected in a manner to permit direct contact between webbing 15 and a series of protrusions 68 provided in recessed cavity 70. In a condition of impact loading on webbing 15, spring 62 is deflected and depressed toward protrusions 68 and the increased tension causes the webbing to move into direct contact with the protrusions. A deflected configuration of spring 62 for tongue 60 is illustrated in the cross-sectional view of FIG. 6. That view shows spring element 62 being deflected in the direction of the arrows during a belt loading situation, allowing webbing 15 to contact and frictionally engage with protrusions 68. Spring 62 can be urged toward its normal condition by its own bending flexibility (for example by cantilever support of it at one end) or a discrete spring element (not shown) may be employed. It is noted that in a restraint condition webbing 15 will not make contact with protrusions 68 since the lateral edges of the webbing will continue to bear against surfaces 66. However, sufficient engagement between webbing 15 and protrusions 68 will occur to provide the desired high friction interaction.

Since protrusions 68 do not normally make contact with the belt, webbing abrasion of the webbing or of protrusions 68 does not occur during normal belt usage. One benefit of this approach is that protrusions 68 can be formed having a very aggressive nature in terms of engagement with the webbing, since abrasion during normal use will not be an issue. Various configurations for protrusions 68 may be provided. In this embodiment protrusions 68 are provided in the form of "chevron" shaped elongated slanted teeth. Later in this description, a number of alternative configurations for protrusions 68 are described which may be used for tongue 60 (as well as the next described embodiment).

Figure 7:
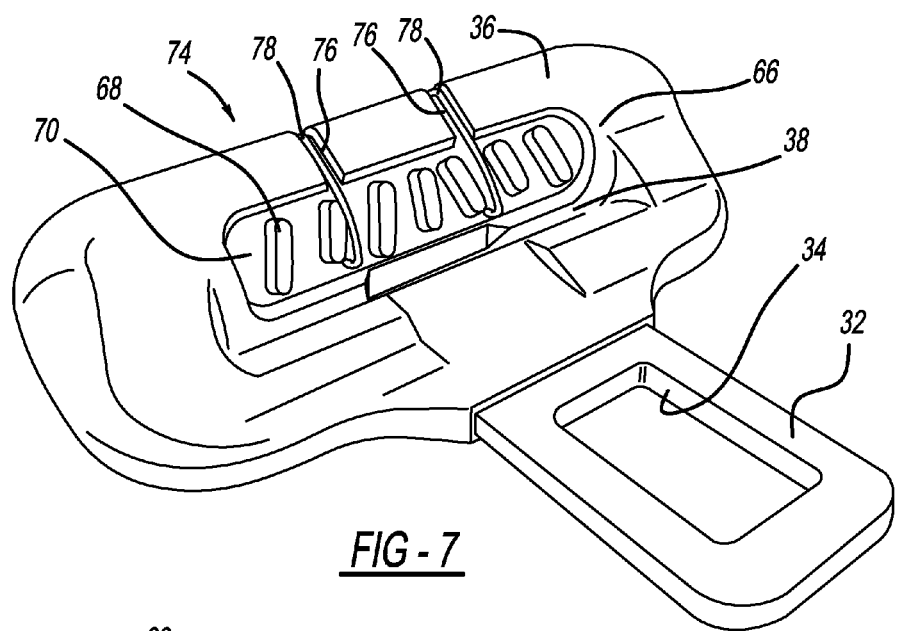
FIG. 7 is an isometric view of a third embodiment of a grip tongue in accordance with the present invention.

A third embodiment of grip tongue 74 is provided with reference to FIG. 7. Tongue 74 is similar to tongue 60 except that the single spring element 62 is replaced by a pair of separated round wire spring elements 76. Spring elements 76 are biased to in a manner similar to spring 62 to hold webbing 15 away from contact with protrusions 68 while permitting engagement with the friction surface formed by protrusions 68 in crash conditions. A pair of slots 78 is provided to allow spring elements 76 to recess in response to belt loading. Protrusions 68 for this embodiment have a shape similar to that described for grip tongue 60.

Figure 8A:
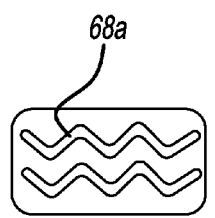
FIGS. 8A-8E show various configurations for a high friction surface which may be used for the grip tongue embodiments of the present invention.
Figure 8B:
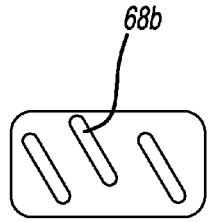
Figure 8C:
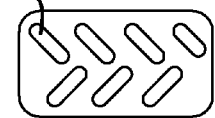
Figure 8D:
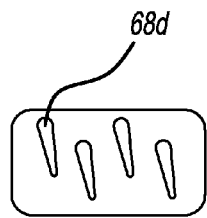
Figure 8E:
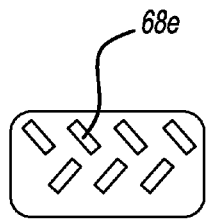

FIGS. 8A-8E illustrate various friction surface geometries for grip tongues in accordance with the present invention. These configurations can be formed of various materials such as a resin or metal materials. FIG. 8A shows a wave like configuration for the protrusions 68a. FIG. 8B illustrates the slanted "chevron" configuration for protrusions 68b described previously except here the individual elements are offset such that their upper and lower ends are displaced alternately such that their upper and lower edges are not mutually aligned. FIG. 8C illustrates shorter chevron shaped protrusions 68c formed in a pair (or more) of rows of protrusions oriented in opposing directions. FIG. 8D illustrates protrusions 68d which may have a teardrop like or another shape departed from a generally rectangular root configuration. FIG. 8E shows protrusions 68e is similar to protrusions 68c with the protrusions having sharp corner edges.

Grip tongues 30, 60, and 74 provide numerous embodiments over prior art designs. The main features and advantages of these designs are: lighter weight compared to a crash locking tongue, lower cost due to fewer components compared to locking tongues, and improved occupant restraint performance compared to standard tongues.

While the above description constitutes the preferred embodiment of the present invention, it will be appreciated that the invention is susceptible to modification, variation and change without departing from the proper scope and fair meaning of the accompanying claims.

The invention claimed is:

1. A tongue for a motor vehicle seat belt restraint system including a buckle for releasable fastening to the tongue and having a belt webbing defining a shoulder belt portion and a lap belt portion when the restraint system is fastened to restrain an occupant, comprising;
    a tongue body forming an extending engagement tab for engagement with the buckle,
    the tongue body further forming a webbing engagement slot and a pair of side edges for guiding the webbing through the slot,
    a deformable element carried by the tongue body movable between a normal condition and a restraint condition, the restraint condition occurring upon resilient deflection of the deformable element responding to tension in the webbing, the deformable element biased toward the normal condition, and
    the tongue body further forming a high friction surface for engagement with the webbing, the deformable element in the normal condition urging the webbing away from contact and engagement with the high friction surface, and the deformable element in the restraint condition permitting contact between the high friction surface and the webbing thereby reducing transfer of the webbing from the lap belt portion to the shoulder belt portion,
    wherein the deformable element in the form of a plate extending along the width of the slot and forming a plurality of apertures, the high friction surface in the form of a plurality of protrusions which are recessed from the apertures when the deformable element is in the normal condition, and protrude from the apertures engaging the webbing in the restraint condition.

2. A tongue for a motor vehicle seat belt restraint system in accordance with claim 1, further comprising the plate biased by a spring element toward the normal condition.

3. A tongue for a motor vehicle seat belt restraint system in accordance with claim 1, further comprising the plate movable to the restraint condition by deformation of the plate.

4. A tongue for a motor vehicle seat belt restraint system in accordance with claim 1, further comprising the high friction surface formed by a resin material.

5. A tongue for a motor vehicle seat belt restraint system in accordance with claim 1, further comprising the high friction surface formed by a metallic material.

6. A tongue for a motor vehicle seat belt restraint system in accordance with claim 1, further comprising the high friction surface formed by a plurality of generally conical protrusions.

7. A tongue for a motor vehicle seat belt restraint system including a buckle for releasable fastening to the tongue and having a belt webbing defining a shoulder belt portion and a lap belt portion when the restraint system is fastened to restrain an occupant, comprising;
    a tongue body forming an extending engagement tab for engagement with the buckle,
    the tongue body further forming a webbing engagement slot and a pair of side edges for guiding the webbing through the slot,
    a deformable element carried by the tongue body movable between a normal condition and a restraint condition, the restraint condition occurring upon resilient deflection of the deformable element responding to tension in the webbing, the deformable element biased toward the normal condition, and
    the tongue body further forming a high friction surface for engagement with the webbing, the deformable element in the normal condition urging the webbing away from contact and engagement with the high friction surface, and the deformable element in the restraint condition permitting contact between the high friction surface and the webbing thereby reducing transfer of the webbing from the lap belt portion to the shoulder belt portion,
    wherein the deformable element in the form of a plurality of spring elements positioned along the webbing slot and the tongue body further forming a pair of lateral webbing contact surfaces, the spring elements and the webbing contact surfaces urging the webbing away from engagement with the high friction surface in the normal condition, and the spring elements deflecting to permit engagement with at least a portion of the webbing in the restraint condition.

8. A tongue for a motor vehicle seat belt restraint system in accordance with claim 7, further comprising the high friction surface formed by a series of elongated angled bars.

9. A tongue for a motor vehicle seat belt restraint system in accordance with claim 8, further comprising the high friction surface formed by at least a series of elongated angled bars alternately offset.

10. A tongue for a motor vehicle seat belt restraint system in accordance with claim 8, further comprising the high friction surface formed by the series of elongated angled bars having a generally rectangular root configuration.

11. A tongue for a motor vehicle seat belt restraint system in accordance with claim 8, further comprising the high friction surface formed by the series of elongated angled bars having a generally teardrop root configuration.

12. A tongue for a motor vehicle seat belt restraint system in accordance with claim 7, further comprising the high friction surface formed by at least a series of waves like bars.

13. A tongue for a motor vehicle seat belt restraint system in accordance with claim 7, further comprising the high friction surface formed of by a first row of angled bars and a second row of angled bars oriented in differing lateral directions.

14. A tongue for a motor vehicle seat belt restraint system in accordance with claim 7, further comprising the high friction surface formed by a resin material.

15. A tongue for a motor vehicle seat belt restraint system in accordance with claim 7, further comprising the high friction surface formed by a metallic material.

* * * * *